United States Patent
Pikus (10) Patent No.: US 10,895,864 B2
(45) Date of Patent: Jan. 19, 2021

(54) FABRIC-INDEPENDENT MULTI-PATTERNING

(71) Applicant: Mentor Graphics Corporation, Wilsonville, OR (US)

(72) Inventor: Fedor G. Pikus, Beaverton, OR (US)

(73) Assignee: Mentor Graphics Corporation, Wilsonville, OR (US)

(*) Notice: Subject to any disclaimer, the term of this patent is extended or adjusted under 35 U.S.C. 154(b) by 4 days.

(21) Appl. No.: 16/413,686

(22) Filed: May 16, 2019

(65) Prior Publication Data

US 2019/0361425 A1 Nov. 28, 2019

Related U.S. Application Data

(60) Provisional application No. 62/675,288, filed on May 23, 2018.

(51) Int. Cl.
*G05B 19/4097* (2006.01)
*G03F 7/20* (2006.01)
*G06F 111/20* (2020.01)
*G06F 119/18* (2020.01)

(52) U.S. Cl.
CPC ......... *G05B 19/4097* (2013.01); *G03F 7/705* (2013.01); *G05B 2219/45026* (2013.01); *G06F 2111/20* (2020.01); *G06F 2119/18* (2020.01)

(58) Field of Classification Search
CPC ...... G05B 19/4097; G05B 2219/45026; G03F 7/705; G06F 2217/02; G06F 2217/12

USPC .......................................................... 716/54
See application file for complete search history.

(56) References Cited

U.S. PATENT DOCUMENTS

| | | | | |
|---|---|---|---|---|
| 8,726,215 B2* | 5/2014 | Lee et al. | ............. | G06F 30/398 716/119 |
| 8,782,570 B1* | 7/2014 | Li et al. | ................ | G06F 30/00 716/52 |
| 8,935,639 B1* | 1/2015 | Tzeng et al. | .......... | G06F 30/394 716/55 |
| 9,335,624 B2* | 5/2016 | Lee et al. | ................ | G03F 1/00 |
| 10,134,355 B2* | 11/2018 | Che | ........................... | G06T 1/20 |
| 10,395,001 B2* | 8/2019 | Chang | ................... | G06F 30/398 |

* cited by examiner

*Primary Examiner* — Sun J Lin (57) ABSTRACT

Disclosed systems and methods may support fabric-independent multi-patterning. A system may include a coloring constraint access engine and a fabric-independent multi-patterning engine. The coloring constraint access engine may be configured to access a set of coloring constraints to apply to geometric elements of a circuit design without accessing a fabric layer that defines a layout of the geometric elements of the circuit design, the set of coloring constraints applicable to multi-patterning the geometric elements of the circuit design to support manufacture of circuit layers using multiple manufacturing steps (e.g., via complementary lithographic masks). The fabric-independent multi-patterning engine may be configured to perform, independent of the fabric layer, a pattern coloring process according to the set of coloring constraints to determine a color assignment for the geometric elements, respectively.

20 Claims, 6 Drawing Sheets

FABRIC-INDEPENDENT MULTI-PATTERNING

CROSS-REFERENCE TO RELATED APPLICATIONS

This application claims the benefit of priority to U.S. Provisional Application No. 62/675,288, filed on May 23, 2018 and titled "FABRIC-LESS MULTI-PATTERNING", which is incorporated herein by reference in its entirety.

BACKGROUND

Electronic circuits, such as integrated microcircuits, are used in nearly every facet of modern society from automobiles to microwaves to personal computers. Design of microcircuits may involve many steps, known as a "design flow." The particular steps of a design flow are often dependent upon the type of microcircuit being designed, its complexity, the design team, and the microcircuit fabricator or foundry that will manufacture the microcircuit. Electronic design automation (EDA) applications support the design and verification of circuits prior to fabrication. EDA applications may implement various EDA procedures, e.g., functions, tools, or features to analyze, test, or verify a design at various stages of the design flow.

SUMMARY

Disclosed implementations include systems, methods, devices, and logic that support fabric-independent multi-patterning.

In one example, a method may be performed, executed, or otherwise carried out by a computing system. The method may include accessing a set of coloring constraints to apply to geometric elements of a circuit design without accessing a fabric layer that defines a layout of the geometric elements of the circuit design, the coloring constraints applicable to multi-patterning the geometric elements of the circuit design to support manufacture of circuit layers using multiple manufacturing steps. The method may further include performing, independent of the fabric layer, a pattern coloring process according to the set of coloring constraints to determine a color assignment for the geometric elements of the circuit design.

In another example, a non-transitory computer-readable medium may store processor-executable instructions. When executed, the instructions may cause a computing system to access a set of coloring constraints to apply to geometric elements of a circuit design without a accessing fabric layer that defines a layout of the geometric elements of the circuit design, the coloring constraints applicable to multi-patterning the geometric elements of the circuit design to support manufacture of circuit layers using multiple manufacturing steps; and perform, independent of the fabric layer, a pattern coloring process according to the set of coloring constraints to determine a color assignment for the geometric elements of the circuit design.

In yet another example, a system may include a coloring constraint access engine and a fabric-independent multi-patterning engine. The coloring constraint access engine may be configured to access a set of coloring constraints to apply to geometric elements of a circuit design without accessing a fabric layer that defines a layout of the geometric elements of the circuit design, the coloring constraints applicable to multi-patterning the geometric elements of the circuit design to support manufacture of circuit layers using multiple manufacturing steps. The fabric-independent multi-patterning engine may be configured to perform, independent of the fabric layer, a pattern coloring process according to the set of coloring constraints to determine a respective color assignment for the geometric elements of the circuit design.

BRIEF DESCRIPTION OF THE DRAWINGS

Certain examples are described in the following detailed description and in reference to the drawings.

DETAILED DESCRIPTION

Modern integrated circuits continue to increase in complexity and structural density. In modern lithographic manufacturing processes, a single physical layer of an integrated circuit device can be formed using two or more separate lithographic masks. To support construction of physical layers using multiple masks, geometric elements (e.g., polygons) in layout design data representing a physical layer of an integrated circuit can be partitioned into two or more groups, which may be referred to herein as "colors". The colors may correspond to different lithographic masks that are complementarily used to form a physical layer of the integrated circuit.

Layout design data may also be referred to herein as a fabric layer. A fabric layer may include a layer of circuit components in the form of geometric elements, such as polygons, circular or elliptical shapes, or other geometric shapes. Geometric elements of a fabric layer may represent shapes that will be created (e.g. etched via lithography) in various materials/substrates to physically manufacture the integrated circuit. As such, geometric elements in a fabric layer may represent (individually or in combination) circuit components such as contacts, channels, gates, etc.

Geometric elements in a fabric layer may be colored to designate different lithographic masks that the geometric elements will be manufactured from. To illustrate, a fabric layer may include a series of closely-spaced parallel connective lines, and a multi-patterning process to color the fabric may partition different the adjacent lines such that a first of the adjacent lines is physically formed by a different masks than a second of the adjacent lines. As such, the first and second line on the same physical layer of the circuit may be physically formed in separate lithographic processes. This technique may be referred to as "double patterning", as geometric elements of a fabric layer may be assigned (also referred to as colored or patterned) with one of the two colors in a double patterning scheme. In a consistent manner, techniques may divide a fabric layer into three sets of geometric elements, each of which is then used to form a complementary lithographic mask pattern. Such a patterning process may be referred to a "triple patterning". The use two, three, four, or even more complementary masks and coloring of multiple sets of geometric elements in layout design data can generally be referred to as multiple patterning or multi-patterning.

The technology disclosed herein may provide for fabric-independent multi-patterning. As described in greater detail herein, the disclosed technology may provide the capability to specify and implement coloring constraints on geometric elements of circuit designs independent of the fabric layer upon which the geometric elements are positioned. Moreover, the fabric-independent multi-patterning features described herein may separate the multi-patterning determinations of color assignments for geometric elements from the geometry processing of fabric layers, which may allow for increased flexibility and capability to specify coloring constraints between geometric elements that would otherwise violate geometry limitations of the fabric layers. As such, the technology disclosed herein may support expression and enforcement of coloring constraints that are independent of (and thus not subject to) limitations of an underlying fabric layer representation.

These and other fabric-independent multi-patterning features and technical benefits are described in greater detail herein.

The execution of various fabric-less multi-patterning features according to the disclosed technology may be implemented using computer-executable software instructions executed by one or more programmable computing devices. Because these implementations of the disclosed technology may be implemented using software instructions, the components and operation of a programmable computer system on which various implementations of the disclosed technology may be employed is described. Further, because of the complexity of some EDA processes and the large size of many circuit designs, various EDA tools are configured to operate on a computing system capable of simultaneously running multiple processing threads. The components and operation of a computer network having a host or master computer and one or more remote or secondary computers therefore will be described with reference to FIG. 1. This operating environment is but one example of a suitable operating environment and is not intended to suggest any limitation as to the scope of use or functionality of the disclosed technology.

Figure 1:
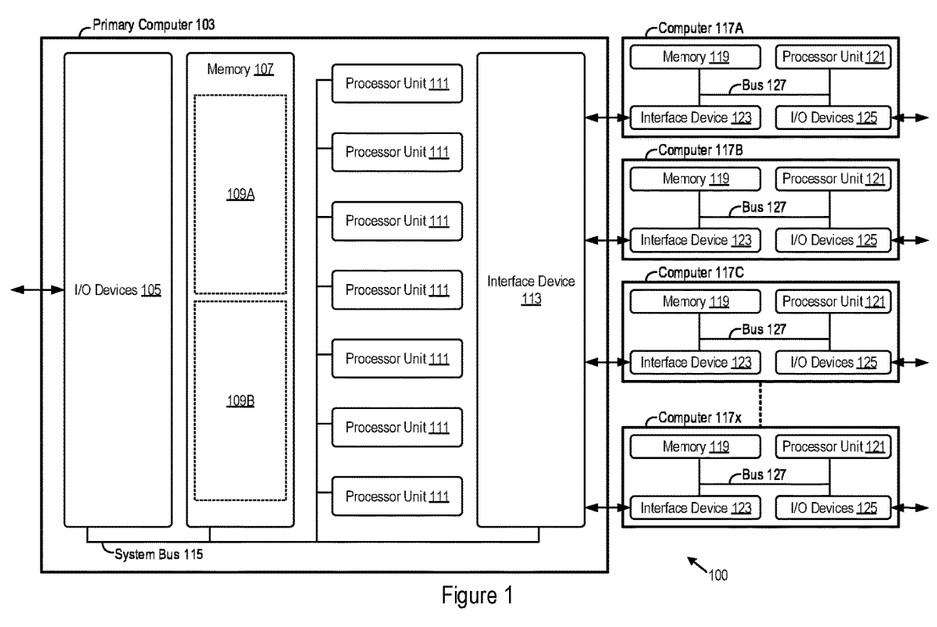
FIG. 1 shows an example of a computing system that supports fabric-independent multi-patterning.

FIG. 1 shows an example of a computing system 100 that supports fabric-independent multi-patterning. In FIG. 1, the computing system 100 includes a primary computer 103 (also referred to as a master computer). The primary computer 103 may be referred to as primary (or master) in that it may control the operation of other computing components of a distributed system, e.g., secondary (or slave) computers. In the illustrated example, the primary computer 103 is a multi-processor computer that includes a plurality of input/output devices 105 and a memory 107. The input/output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device.

The memory 107 may be implemented using any combination of computer readable media that can be accessed by the primary computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the primary computer 103 may implement (e.g., execute) an EDA software application for performing any combination of the various section-based PTO processing features described herein. Accordingly, the memory 107 may store software instructions 109A that, when executed, will implement an EDA software application that provides any combination of the disclosed technology. The memory 107 may also store data 109B to be used with the EDA software application. In the illustrated implementation, the data 109B contains process data that an EDA software application may to perform EDA operations (e.g., PTO flows), at least some of which may be parallel.

The primary computer 103 may include a plurality of processor units 111 and an interface device 113. The processor units 111 may be any type of processor device that can be programmed to execute the software instructions 109A, such as a microprocessor device. For example, one or more of the processor units 111 may be a commercially programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107, and the input/output devices 105 may be communicatively linked together by a system bus 115.

Figure 2:
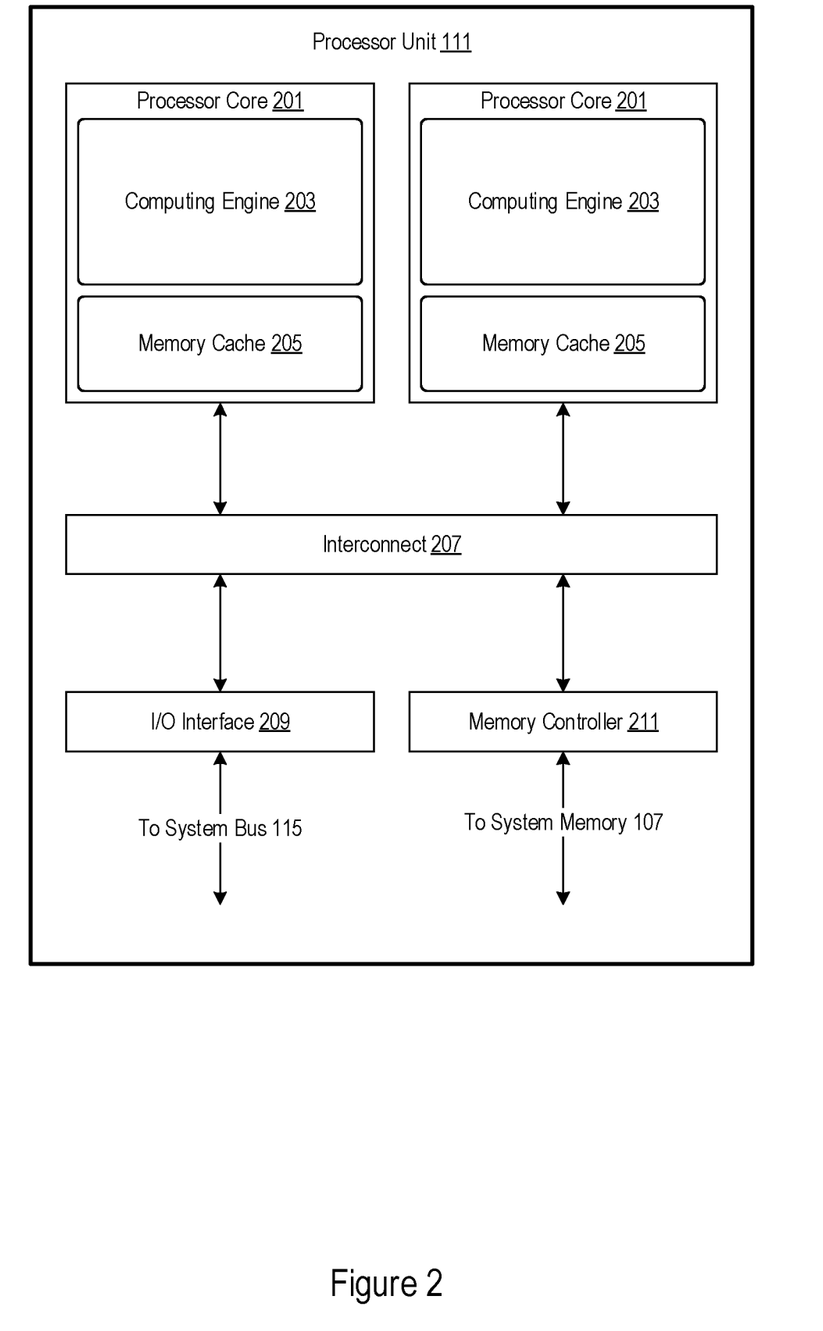
FIG. 2 shows an example of a multi-core processor unit that may be employed with various implementations of the fabric-independent multi-patterning features described herein.

With some implementations of the disclosed technology, the primary computer 103 may employ one or more processor units 111 having more than one processor core. Accordingly, FIG. 2 shows an example of a multi-core processor unit that may be employed with various implementations of the section-based PTO processing features described herein. In the example shown in FIG. 2, the processor unit 111 includes a plurality of processor cores 201. Each processor core 201 may include a computing engine 203 and a memory cache 205. A computing engine 203 may contain logic devices for performing various computing functions, such as fetching software instructions and performing actions specified in the fetched software instructions. Example actions include mathematical operations such as adding, subtracting, multiplying, and comparing numbers, logical operations such as AND, OR, NOR and XOR operations, as well as data retrieval operations, e.g., memory reads or writes. Each computing engine 203 may use its corresponding memory cache 205 to store and retrieve data and/or instructions for execution with increased access speeds.

Each processor core 201 may be connected to an interconnect 207. The particular construction of the interconnect 207 may vary depending upon the architecture of the processor unit 111. With some processor cores 201, the interconnect 207 may be implemented as an interconnect bus. With other processor cores 201, however, the interconnect 207 may be implemented as a system request interface device. In any case, the processor cores 201 may communicate through the interconnect 207 with an input/output interface 209 and a memory controller 211. The input/output interface 209 may provide a communication interface between the processor cores 201 and system bus 115. In a similar manner, the memory controller 211 may control the exchange of information between the processor unit 111 and the memory 107. With some implementations of the disclosed technology, the processor unit 111 may include additional components, such as a high-level cache memory shared by the processor cores 201.

While FIG. 2 shows one illustration of a processor unit 111 that may be employed by some implementations of the disclosed technology, it should be appreciated that this illustration is representative only, and is not intended to be limiting. Accordingly, some implementations of the disclosed technology may employ a primary computer 103 with one or more processors that employ multiple input/output interfaces 209 and multiple memory controllers 211. Additionally or alternatively, such processors may have multiple processor cores 201 of differing processor types. In some implementations, the different processor cores 201 of a primary computer 103 may include six (6) or more synergistic processor elements (SPEs) and a power processor element (PPE). Each SPE may include vector-type computing engine 203 with 428×428 bit registers, four (4) single-precision floating point computational units, four (4) integer computational units, and a 556 KB local store memory that stores both instructions and data. The PPE may control tasks performed by the SPE. In this example configuration, these processors can perform some mathematical operations, such as the calculation of fast Fourier transforms (FFTs), at substantially higher speeds than other processors.

It also should be appreciated that, with some implementations, a multi-core processor unit 111 can be used in lieu of multiple, separate processor units 111 with a single processor core. For example, rather than employing six separate processor units 111 (each with a single core), an alternate implementation of the disclosed technology may employ a single processor unit 111 having six processor cores, two multi-core processor units 111 each having three processor cores, a multi-core processor unit 111 with four computing cores together with two separate single-core processor units 111, etc.

Returning now to FIG. 1, the interface device 113 may allow the primary computer 103 to communicate with the secondary computers 117A, 117B, 117C . . . 117x through a communication interface. The secondary computers 117A, 117b, 117C . . . 117x may be referred to as secondary (or as slave computers) as part of a distributed system controlled by the primary computer 103. In some instances, the secondary computers 117A, 117B, 117C . . . 117x may also be referred to as remote computers with computing or data resources accessible for execution of EDA processes. As seen in FIG. 1, the computing system 100 including the primary computer 103 and secondary computers 117 may form a distributed system that supports execution of EDA processes and EDA flows. As circuit designs and analyses capabilities continue to increase in complexity, the computing system 100 may include an increasing number of computing cores to improve EDA application performance. In some instances, distributed systems may include thousands to tens of thousands of processor cores (and possibly more) to support execution of EDA flows, including PTO flows.

The communication interface that interlinks the primary computer 103 and secondary computers 117A, 117B, 117C . . . 117x may be any suitable type of communication network that supports inter-device communications. Example implementations include a conventional wired network connection or an optically transmissive wired network connection. The communication interface may also take the form of a wireless connection, such as a wireless optical connection, a radio frequency connection, an infrared connection, or even an acoustic connection. Combinations of network types are also contemplated. The interface device 113 may translate data and control signals from the primary computer 103 and each of the secondary computers 117 into network messages according to one or more communication protocols, such as the transmission control protocol (TCP), the user datagram protocol (UDP), and the Internet protocol (IP).

A secondary computer 117 may include a memory 119, a processor unit 121, an interface device 123, and, optionally, one more input/output devices 125 connected together by a system bus 127. As with the primary computer 103, the optional input/output devices 125 for the secondary computers 117 may include any type of input or output devices, such as keyboards, pointing devices, microphones, display monitors, speakers, and printers. Similarly, the processor units 121 may be any type of conventional or custom-manufactured programmable processor device, e.g., as described above with regards to the processor unit 111. Still further, one or more of the processor units 121 may have more than one core, as described with reference to FIG. 2 above. The memory 119 of the secondary computers 117 may be implemented using any combination of the computer readable media discussed above. In a consistent manner as described for the interface device 113, the interface devices 123 may allow the secondary computers 117 to communicate with the primary computer 103 over the communication interface.

In the example illustrated in FIG. 1, the primary computer 103 is a multi-processor unit computer with multiple processor units 111, while each secondary computer 117 has a single processor unit 121. It should be noted, however, that alternate implementations of the disclosed technology may employ a primary computer having single processor unit 111. Further, one or more of the secondary computers 117 may have multiple processor units 121, depending upon their intended use, as previously discussed. Also, while only a single interface device 113 or 123 is illustrated for the primary computer 103 and the secondary computers 117, it should be noted that the primary computer 103, one or more of the secondary computers 117, or a combination of both, may use two or more different interface devices 113 or 123 for communicating over multiple communication interfaces.

With various examples of the disclosed technology, the primary computer 103 may be connected to one or more external data storage devices. These external data storage devices may be implemented using any combination of computer readable media that can be accessed by the primary computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the disclosed technology, one or more of the secondary computers 117 may alternately or additionally be connected to one or more external data storage devices. Typically, these external data storage devices will include data storage devices that also are connected to the primary computer 103, but they also may be different from any data storage devices accessible by the primary computer 103.

It also should be appreciated that the description of the computing systems illustrated in FIGS. 1 and 2 are provided as an example only, and are not intended to suggest any limitation as to the scope of use or functionality of alternate implementations of the disclosed technology.

Figure 3:
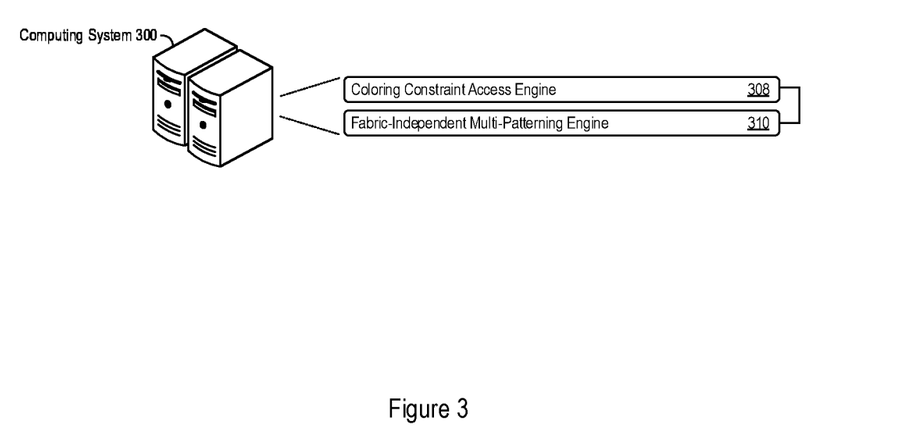
FIG. 3 shows another example of a computing system that supports fabric-independent multi-patterning.

FIG. 3 shows another example of a computing system 300 that supports fabric-independent multi-patterning. The computing system 300 may include a single or multiple computing devices such as application servers, compute nodes, data servers, desktop or laptop computers, smart phones or other mobile devices, tablet devices, embedded controllers, and more. In some instances, the computing system 300 may implement, execute, or provide an EDA application through which circuit designs can be edited, verified, or otherwise analyzed, including to multi-pattern geometric elements of physical layouts (e.g., fabric layers) in support of generating complementary lithographic masks for circuit manufacture.

The computing system 300 may be implemented in various ways to provide any of the fabric-independent multi-patterning features described herein. As an example implementation, the computing system 300 shown in FIG. 3 includes a coloring constraint access engine 308 and a fabric-independent multi-patterning engine 310. The computing system 300 may implement the engines 308 and 310 (and components thereof) in various ways, for example as hardware and programming. The programming for the engines 308 and 310 may take the form of processor-executable instructions stored on a non-transitory machine-readable storage medium and the hardware for the engines 308 and 310 may include any number of processors to execute those instructions (e.g., processing units as described in FIGS. 1 and 2). The computing system 300 may implement the engines 308 and 310 using any combination of the hardware components described in FIGS. 1 and 2, and in some examples, the computing system 300 implements multiple engines using the same computing system features or hardware components (e.g., a common processor or a common storage medium).

In operation, the coloring constraint access engine 308 may access a set of coloring constraints to apply to geometric elements of a circuit design, and do so without accessing a fabric layer that defines a layout of the geometric elements of the circuit design. The accessed coloring constraints may be applicable to assign colors to (e.g., multi-pattern) the geometric elements of the circuit design to support manufacture of circuit layers using multiple manufacturing steps (e.g., via complementary lithographic masks). In operation, the fabric-independent multi-patterning engine 310 may perform, independent of the fabric layer, a pattern coloring process according to the set of coloring constraints to determine a respective color assignment for the geometric elements of the circuit design.

These and other fabric-independent multi-patterning features are described in greater detail next.

Figure 4:
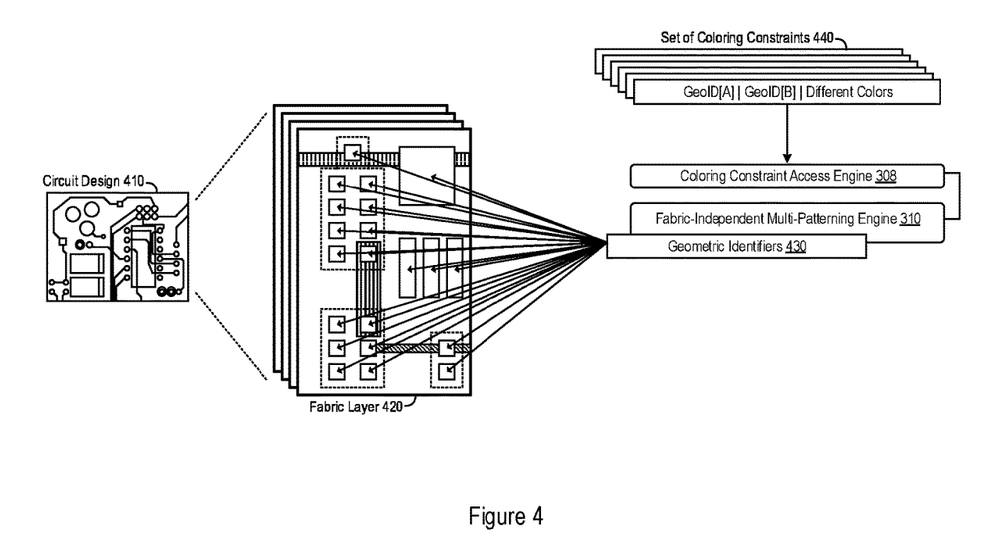
FIG. 4 shows an example access of coloring constraints by a coloring constraint access engine in accordance with geometric identifiers mapped by a fabric-independent multi-patterning engine.

FIG. 4 shows an example access of coloring constraints by the coloring constraint access engine 308 in accordance with geometric identifiers mapped by the fabric-independent multi-patterning engine 310. In particular, FIG. 4 illustrates a circuit design 410, which may be generated through an EDA application. The EDA application may provide multiple EDA capabilities and represent the circuit design 410 as physical layout data in the form of one or more fabric layers 420. Each fabric layer 420 may represent one or more physical layers of the circuit design 410, and may thus include geometric elements positioned in the layer to represent specific circuit components such as transistors, contacts, channels, gates, etc.

The fabric layer 420 may be implemented as a specific geometric representation according to fabric parameters limited by a given EDA application. Such fabric parameters may specify particular types of polygons or other geometric shapes that the given EDA application is capable (or incapable) of defining in the fabric layer 420. For instance, a given EDA application may support defining and positioning rectangular and triangular polygons in the fabric layer 420, but may be incapable (or does not include implemented functionality) to define circular shapes in the fabric layer 420. As such, fabric layers 420 may be characterized by geometric limitations that restraint the types of geometric elements supported by an EDA application.

The fabric layer 420 may also be limited by the geometry processing capability of an EDA application. Such geometry processing may limit how different geometric elements defined and positioned in the fabric layer 420 can interact. For instance, a given EDA application may be incapable of defining a relationship between two geometric elements in the fabric layer 420 if the two geometric elements overlap (at least partially), are positioned on opposites sides of the same physical circuit layer, do not share an open line of sight (e.g., no straight line can connect the two geometric elements without intersecting one or more other geometric elements), or in other ways. Other example geometric limitations include 2-dimensional geometric element requirements, planar-only positioning, incapability to combine multiple polygons to together form a single geometric element, straight-line requirements to define inter-related geometric elements, etc. In a general sense, geometric elements defined on the fabric layer 420 can be subject to geometric limitations imposed by a given EDA application based on the geometry processing capabilities implemented for the given EDA application. Such limitations may impact multi-patterning in that an EDA application may be incapable of specifying coloring relationships (e.g., constraints) in a fabric layer 420 whether for a particular geometric element or between multiple different geometric elements of the fabric layer 420 if doing so would violate the geometric limitations imposed on the fabric layer 420.

The fabric-independent multi-patterning features described herein may support defining of coloring constraints independent of the fabric layer 420, and thus independent of the underlying geometric limitations of the fabric layer 420 imposed by a given EDA application. As used herein, a coloring constraint may refer to any color requirement, condition, restriction, or other parameter for one or more geometric elements of a physical layout data in support of multi-patterning processes for generating complementary lithographic masks. Example coloring constraints may set a particular color for a geometric element (and thus assign the geometric element to a particular lithographic mask), define a color relationship between two or more geometric elements (e.g., opposite color, same color, etc.), or set conditional parameters for one or more geometric elements (e.g., assign a given geometric element to color '1' IF a neighboring geometric element is assigned color '0', otherwise assign color '0'). Any type of coloring requirement, condition, or restriction are contemplated for the coloring constraints described herein.

Example features as to how the coloring constraint access engine 308 and the fabric-independent multi-patterning engine 310 may support fabric-independent multi-patterning are illustrated in FIG. 4. As seen in FIG. 4, the fabric-independent multi-patterning engine 310 may assign geometric identifiers 430 to geometric elements of the fabric layer 420. The geometric identifiers 430 may be generated and assigned by the fabric-independent multi-patterning engine 310 such that different geometric elements of the fabric layer 420 are assigned different geometric identifiers. Put another way, the geometric identifiers 430 may uniquely identify geometric elements in the fabric layer 420 such that no two geometric elements in the fabric layer 420 (and, more broadly the circuit design 410, in whole or in part) are assigned an identical geometric identifier. Assigned geometric identifiers may be implemented in various forms, e.g., as an alphanumeric identifier assigned when a geometric element is identified or added to the fabric layer 420 or, in some instances, as a set or combination of multiple values for a particular geometric identifier.

The fabric-independent multi-patterning engine 310 may map geometric elements of the fabric layer 420 to respective geometric identifiers 430 such that each geometric identifier comprises one or more values that, each individually or together in combination, uniquely identify a given geometric element in the fabric layer 420 (and, more broadly, the circuit design 410). The fabric-independent multi-patterning engine 310 may maintain a mapping between geometric elements of the fabric layer 420 and the assigned geometric identifiers 430. To do so, the fabric-independent multi-patterning engine 310 may utilize any suitable data structure to map assigned geometric identifiers 430 to corresponding geometric elements, such as relational databases, lookup tables, and other suitable data structures.

Through the assigned geometric identifiers 430, the coloring constraint access engine 308 may support expression of coloring constraints independent to the fabric layer 420. To illustrate through FIG. 4, the coloring constraint access engine 308 may access a set of coloring constraints 440. A given coloring constraint in the set of coloring constraints 440 may include one or more geometric identifiers that the given coloring constraint applies to as well as the specific constraint requirement itself. For instance, one of the depicted coloring constraints 440 in FIG. 4 applies to geometric identifier "A" and geometric identifier "B" and specifies a constraint requirement that geometric identifiers "A" and "B" are assigned different colors for multi-patterning.

Note that the coloring constraints 440 supported by the coloring constraint access engine 308 need not refer to or be tied to specific geometric elements in the fabric layer 420, and may instead refer solely to geometric identifiers 430 as identifying the subject(s) of specified constraint requirements. In that regard, the coloring constraints 440 accessed by the coloring constraint access engine 308 may be abstracted from the fabric layer 420 in that geometric limitations required by the fabric layer 420 may be inapplicable to the coloring constraints 440. Explained in a different way, the coloring constraint access engine 308 may support expression of coloring constraints 440 that are not embedded within, tied to, or otherwise expressed within the fabric layer 420 itself.

To illustrate, a user may wish to specify a coloring constraint between two geometric elements that overlap in the fabric layer 420, but is unable to do so because the fabric layer 420 (and the underlying processing capability of an EDA application) cannot be geometrically processed to specify a relationship between overlapping geometric elements in the same fabric layer 420. As such, setting a coloring constraint between the two overlapping geometric elements within the context of or as expressed within the fabric layer 420 itself may not be possible. Instead, the coloring constraint access engine 308 may design, configure, express, or access coloring constraints 440 specified independently from the fabric layer 420 such that no portion of the coloring constraints 440 is specifically limited to geometric elements in the fabric layer 420 (and the underlying geometric limitations of the fabric layer 420).

In some implementations, the coloring constraint access engine 308 may access the coloring constraints 440 through user input. For instance, the coloring constraint access engine 308 may identify and accept coloring constraints 440 directly input by user via an EDA application user interface. Additionally or alternatively, the coloring constraint access engine 308 may support user selection of geometric elements in the fabric layer 420 (e.g., as displayed in the EDA application user interface), including selection of multiple geometric elements in the fabric layer 420 and specification of a particular constraint requirement (e.g., same color). However, instead of embedding or tying a user-input coloring requirement to the geometric elements in the fabric layer 420 itself, the coloring constraint access engine 308 may identify the assigned geometric identifiers 430 for each of the selected geometric elements and abstract the coloring constraint to be independent from the fabric layer 420. In a consistent manner as noted herein, this may be the case as the coloring constraints 440 merely specify the geometric identifiers and corresponding constraint requirements.

Through abstraction of coloring constraints to include geometric identifiers 430 and not tying the coloring constraints to the fabric layer 420, the fabric-independent multi-patterning engine 310 may determine color assignments for a fabric layer 420 independent of the fabric layer 420 itself. Example features of fabric-independent pattern coloring processes supported by the fabric-independent multi-patterning engine 310 are described next in connection with FIG. 5.

Figure 5:
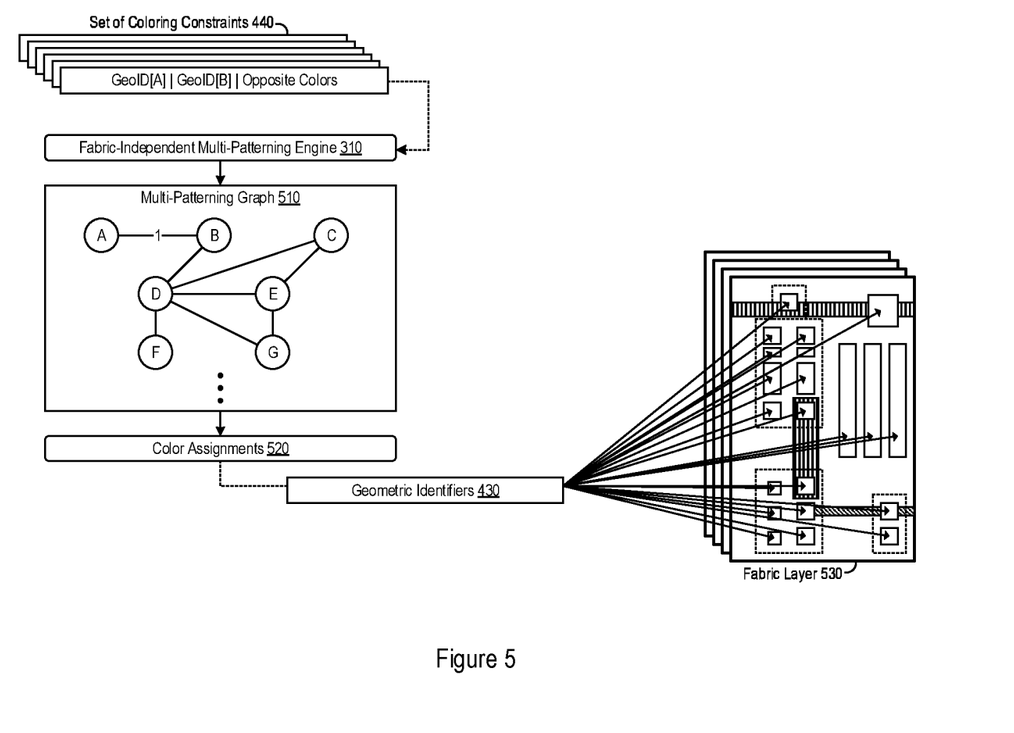
FIG. 5 shows an example determination of color assignments by a fabric-independent multi-patterning engine, independent of fabric layers.

FIG. 5 shows an example determination of color assignments by the fabric-independent multi-patterning engine 310, independent of fabric layers. In FIG. 5, the fabric-independent multi-patterning engine 310 performs a pattern coloring process according to the set of coloring constraints 440 accessed by the coloring constraint access engine 308, doing so to obtain color assignments to apply to a fabric layer.

To do so, the fabric-independent multi-patterning engine 310 may analyze the set of coloring constraints 440 independent of an underlying fabric layer. To perform the pattern coloring process, the fabric-independent multi-patterning engine 310 may construct a multi-patterning graph 510 from the set of coloring constraints 440. As the set of coloring constraints 440 may be accessed without any reference or dependence on an underlying fabric layer, the fabric-independent multi-patterning engine 310 may construct the multi-patterning graph 510 without any actual reference or reliance on an underlying layout design. Instead, the fabric-independent multi-patterning engine 310 may, in effect, infer the existence of geometric elements according to the geometric identifiers specified in each of the coloring constraints 440.

To illustrate, the fabric-independent multi-patterning engine 310 may construct the multi-patterning graph 510 by representing a given geometric identifier in a coloring constraint with a given node in the multi-patterning graph. Thus, for a coloring constraint that requires geometric identifiers "A" and "B" to be assigned different colors, the fabric-independent multi-patterning engine 310 may infer the existence of two different geometric elements that correspond to geometric identifiers "A" and "B" respectively. However, the fabric-independent multi-patterning engine 310 need not account for (or even consider or determine) the geometric layout of these two inferred geometric elements in an underlying fabric layer, as such geometric representations are unnecessary to construct the multi-patterning graph 510. For the inferred geometric elements, the fabric-independent multi-patterning engine 310 may insert a node "A" and a node "B" in the multi-patterning graph 510 to represent the inferred geometric elements identified via the parsed coloring constraint.

To further construct the multi-patterning graph 510, the fabric-independent multi-patterning engine 310 may create an edge between a given node mapped for a given geometric identifier (e.g., node "A") and a different node mapped to another geometric identifier (e.g., node "B"), the given node and the different node constrained together by a particular coloring constraint in the set of coloring constraints 440. More generally, the fabric-independent multi-patterning engine 310 may insert edges for any nodes (corresponding to geometric identifiers) that are inter-related by constraint requirements specified by one or more of the coloring constraints 440.

In constructing the multi-patterning graph 510, the fabric-independent multi-patterning engine 310 may also specify coloring constraint requirements as edge attributes. For instance, the fabric-independent multi-patterning engine 310 may specify an edge attribute value of "1" to represent constraint requirements that assign different colors between linked nodes (e.g., corresponding geometric identifiers represented by the nodes) and an edge attribute value "0" to represent constraint requirements assigning the same colors between the linked nodes. Additionally or alternatively, the fabric-independent multi-patterning engine 310 may specify node attributes to represent constraint requirements (e.g., a required color value for the node).

In such a manner, the fabric-independent multi-patterning engine 310 may parse each of the coloring constraints 440 to continually construct the multi-patterning graph 510. For each coloring constraint in the set of coloring constraints 440, the fabric-independent multi-patterning engine 110 may add one or more nodes in inferring the existence of geometric elements represented by parsed geometric identifiers, add edges for any nodes inter-related by a given coloring constraint, and specify edge and/or node attributes to represent the constraint requirement(s) of the given coloring constraint.

While FIG. 5 provides an example implementation of a multi-patterning graph 510 with nodes, edges, and edge attribute, the fabric-independent multi-patterning engine 310 may represent a multi-patterning graph from parsed coloring constraints in any number of ways. Other example structures or forms that the constructed multi-patterning graph may take include sets of arrays that delineate and inter-relate geometric identifiers and constraint requirements, relational database structures, lists, or any other suitable data structure by which the fabric-independent multi-patterning engine 310 may represent accessed coloring constraints to perform a multi-patterning determination of color assignments.

The constructed multi-patterning graph 510 may interrelate and collectively represent the set of coloring constraints 440. Consequently, the fabric-independent multi-patterning engine 310 may "solve" the multi-patterning graph 510, e.g., according to the node and edge attributes that may represent constraint requirements. Doing so may involve application of any number of graph processing techniques and condition-solving processes, the output of which may be color assignments 520 determined from the multi-patterning graph 510. The color assignments 520 may specify an assigned color for some or all of the nodes of the multi-patterning graph 510, which may represent a coloring for geometric elements of an underlying fabric layer. Accordingly, the fabric-independent multi-patterning engine 310 may perform a pattern coloring process for the set of coloring constraints 440 to obtain the color assignments 520.

As the set of coloring constraints 440 may be abstracted from and independent to an underlying fabric layer, the resulting color assignments 520 determined from the set of coloring constraints 440 may likewise be independent from an underlying fabric layer. Understood in a different way, the color assignments 520 may assign colors based specifically on the geometric identifiers specified in the set of coloring constraints 440, and the fabric-independent multi-patterning engine 310 may link the color assignments 520 to actual geometric elements of layout design data. To do so, the fabric-independent multi-patterning engine 310 may access a mapping of the geometric identifiers 430 to assign the determined color assignments 520 to corresponding geometric elements in layout design data. For instance, for a given node "A" in the multi-patterning graph 510 assigned a particular color, the fabric-independent multi-patterning engine 310 may lookup the geometric identifier "A" in a geometric identifier mapping and assign the particular color to the corresponding geometric element mapped to geometric identifier "A". In some implementations, the fabric-independent multi-patterning engine 310 determines not to assign the color assignments 520 to geometric elements of a fabric layer, e.g., when an EDA application includes functionality to prove that a multi-patterning solution exists for given circuit design, but without actually assigning determined colors to the circuit design).

Note that the fabric layer in which the fabric-independent multi-patterning engine 310 assigns the color assignments 520 may be the same or different from the underlying fabric layer from which the set of coloring constraints 440 are expressed from. For instance, the coloring constraint access engine 308 may access of a set of coloring constraints 440 expressed (but abstracted) from an underlying fabric layer 420, and the fabric-independent multi-patterning engine 310 may assign the determined color assignments 520 to a processed fabric layer 530 shown in FIG. 5. The fabric layer 420 and fabric layer 530 may differ in that the fabric layer 530 may have undergone various post-processing, resizing, or other EDA-based verification or design operations, which may result in changing in size, placement, or re-design of any number of geometric elements.

In FIG. 5, the fabric layer 530 includes multiple polygons resized from the fabric layer 420 in FIG. 4. Nonetheless, as the fabric-independent multi-patterning features described herein may separate multi-patterning from geometry processing, the determined color assignments 520 may still be assigned to the fabric layer 530 (e.g., without having to re-specifying constraints or reverting to prior fabric representations). That is, the mapping of geometric identifiers 430 to an underlying fabric layer may be used to specify determined color assignments to subsequent versions or representations of the underlying fabric layer.

In any of the ways herein, the coloring constraint access engine 308 and fabric-independent multi-patterning engine 310 may support fabric-independent multi-patterning. In some instances, a given coloring constraint in a set of coloring constraints violates a geometric limitation of a fabric layer. Even so, the fabric-independent multi-patterning engine 310 may perform a pattern coloring process independent of the fabric layer that includes determining color assignments for geometric elements of a fabric layer/circuit design based on the given coloring constraint without accounting for the given coloring constraint violating the geometric limitation. As such, the fabric-independent multi-patterning features described herein may improve the flexibility and capability of EDA applications to multi-pattern geometric elements of physical layout data in supporting generation of multiple lithographic masks for physical circuit manufacture.

Figure 6:
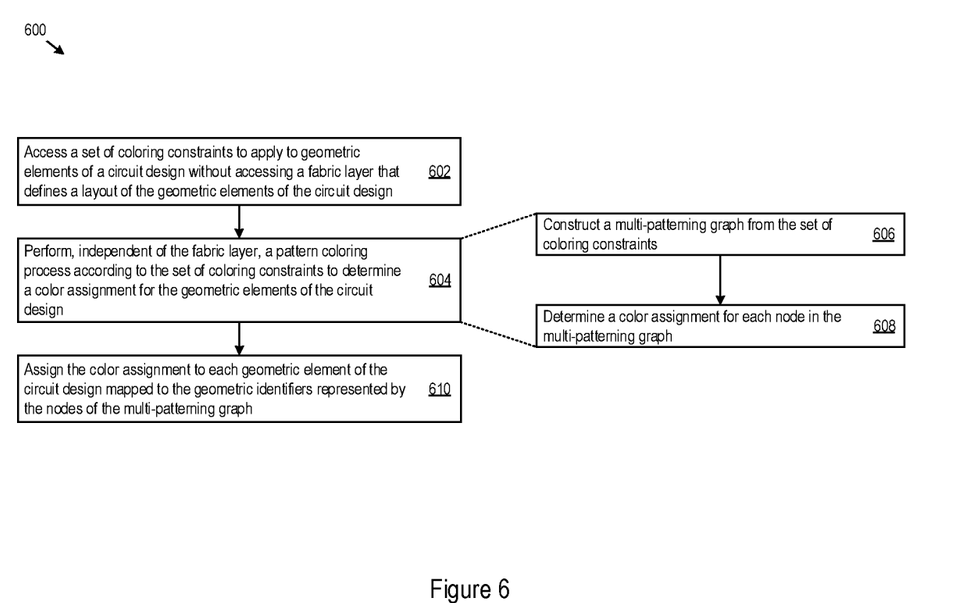
FIG. 6 shows an example of logic that a computing system may implement to support fabric-independent multi-patterning.

FIG. 6 shows an example of logic 600 that a system may implement to support fabric-independent multi-patterning. In some examples, the computing system 100 or computing system 300 may implement the logic 600 as hardware, executable instructions stored on a machine-readable medium, or as a combination of both. For instance, the computing system 300 may implement the logic 600 via the coloring constraint access engine 308 and fabric-independent multi-patterning engine 310, through which the computing system 300 may perform or execute the logic 600 as a method to support fabric-independent multi-patterning. The following description of the logic 600 is provided using the coloring constraint access engine 308 and the fabric-independent multi-patterning engine 310 as an implementation example. However, various other implementation options by a computing system are contemplated herein.

In implementing the logic 600, the coloring constraint access engine 308 may access a set of coloring constraints to apply to geometric elements of a circuit design without accessing a fabric layer that defines a layout of the geometric elements of the circuit design (602). In implementing the logic 600, the fabric-independent multi-patterning engine 310 may perform, independent of the fabric layer, a pattern coloring process according to the set of coloring constraints to determine a color assignment for the geometric elements of the circuit design (604). In performing the coloring process, the fabric-independent multi-patterning engine 310 may construct a multi-patterning graph from the set of coloring constraints (606) and determine a color assignment for each node in the multi-patterning graph (608), doing so in any of the ways described herein. In implementing the logic 600, the fabric-independent multi-patterning engine 310 may also assign the color assignment to each geometric element of the circuit design mapped to the geometric identifiers represented by the nodes of the multi-patterning graph (610).

While an example fabric-independent multi-patterning features are shown and described through FIG. 6, the logic 600 may include any number of additional or alternative steps as well. The logic 600 may additionally or alternatively implement any of the fabric-independent multi-patterning features described herein, for example any with respect to the coloring constraint access engine 308, the fabric-independent multi-patterning engine 310, or combinations of both.

The systems, methods, devices, and logic described herein may be implemented in many different ways in many different combinations of hardware, logic, circuitry, and executable instructions stored on a machine-readable medium. For example, the computing system 100 or computing system 300, including the coloring constraint access engine 308 and the fabric-independent multi-patterning engine 310, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine-readable instructions stored on the medium, which when executed in an endpoint, computer system, or other device, cause the device to perform operations according to any of the description above, including according to any of the fabric-less multi-patterning features described herein.

The processing capability of the systems, devices, and engines described herein, including the coloring constraint access engine 308 and the fabric-independent multi-patterning engine 310, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method executed by a computing system, the method comprising:
   accessing a set of coloring constraints to apply to geometric elements of a circuit design without accessing a fabric layer that defines a layout of the geometric elements of the circuit design, the set of coloring constraints applicable to multi-patterning the geometric elements of the circuit design to support manufacture of circuit layers using multiple manufacturing steps; and
   performing, independent of the fabric layer, a pattern coloring process according to the set of coloring constraints to determine a color assignment for each geometric element of the geometric elements of the circuit design.

2. The method of claim 1, wherein, for a given coloring constraint in the set of coloring constraints:
   the given coloring constraint includes one or more geometric identifiers to apply the given coloring constraint to; and
   each geometric identifier of the one or more geometric identifiers corresponds to a respective geometric element in the circuit design.

3. The method of claim 2, wherein the performing the pattern coloring process independent of the fabric layer comprises constructing a multi-patterning graph from the set of coloring constraints, including by:
   representing a given geometric identifier with a given node in the multi-patterning graph;
   creating an edge between the given node mapped for the given geometric identifier and a different node mapped to another geometric identifier, the given node and the different node constrained together by a particular coloring constraint in the set of coloring constraints; and specifying the particular coloring constraint as an edge attribute of the edge.

4. The method of claim 3, wherein the performing the pattern coloring process independent of the fabric layer comprises determining a respective color assignment for each node in the multi-patterning graph.

5. The method of claim 4, further comprising assigning the color assignment to each geometric element of the circuit design mapped to the geometric identifiers represented by the nodes of the multi-patterning graph.

6. The method of claim 2, further comprising mapping geometric elements of the circuit design to the one or more geometric identifiers, respectively, such that each geometric identifier of the one or more geometric identifiers comprises one or more values that, each individually or together in combination, uniquely identify a given geometric element in the circuit design.

7. The method of claim 1, wherein a given coloring constraint in the set of coloring constraints violates a geometric limitation of the fabric layer; and
wherein the performing the pattern coloring process independent of the fabric layer comprises determining color assignments for geometric elements of the circuit design based on the given coloring constraint without accounting for the given coloring constraint violating the geometric limitation.

8. A non-transitory computer-readable medium storing instructions that, when executed by a processor, cause a computing system to:
access a set of coloring constraints to apply to geometric elements of a circuit design without accessing a fabric layer that defines a layout of the geometric elements of the circuit design, the set of coloring constraints applicable to multi-patterning the geometric elements of the circuit design to support manufacture of circuit layers using multiple manufacturing steps; and
perform, independent of the fabric layer, a pattern coloring process according to the set of coloring constraints to determine a color assignment for each geometric element of the geometric elements of the circuit design.

9. The non-transitory computer-readable medium of claim 8, wherein for a given coloring constraint in the set of coloring constraints:
the given coloring constraint includes one or more geometric identifiers to apply the given coloring constraint to; and
each geometric identifier of the one or more geometric identifiers corresponds to a respective geometric element in the circuit design.

10. The non-transitory computer-readable medium of claim 9, wherein the instructions, when executed, cause the computing system to perform the pattern coloring process independent of the fabric layer by constructing a multi-patterning graph from the set of coloring constraints, including by:
representing a given geometric identifier with a given node in the multi-patterning graph;
creating an edge between the given node mapped for the given geometric identifier and a different node mapped to another geometric identifier, the given node and the different node constrained together by a particular coloring constraint in the set of coloring constraints; and
specifying the particular coloring constraint as an edge attribute of the edge.

11. The non-transitory computer-readable medium of claim 10, wherein the instructions, when executed, cause the computing system to perform the pattern coloring process independent of the fabric layer by determining a respective color assignment for each node in the multi-patterning graph.

12. The non-transitory machine-readable medium of claim 11, wherein the instructions, when executed, further cause the computing system to assign the color assignment to each geometric element of the circuit design mapped to the geometric identifiers represented by the nodes of the multi-patterning graph.

13. The non-transitory computer-readable medium of claim 9, wherein the instructions, when executed, further cause the computing system to map geometric elements of the circuit design to the one or more geometric identifiers, respectively, such that each geometric identifier of the one or more geometric identifiers comprises one or more values that, each individually or together in combination, uniquely identify a given geometric element in the circuit design.

14. The non-transitory computer-readable medium of claim 8, wherein a given coloring constraint in the set of coloring constraints violates a geometric limitation of the fabric layer; and
wherein the instructions, when executed, cause the computing system to perform the pattern coloring process independent of the fabric layer by determining color assignments for geometric elements of the circuit design based on the given coloring constraint without accounting for the given coloring constraint violating the geometric limitation.

15. A system comprising:
a coloring constraint access engine configured to access a set of coloring constraints to apply to geometric elements of a circuit design without accessing a fabric layer that defines a layout of the geometric elements of the circuit design, the set of coloring constraints applicable to multi-patterning the geometric elements of the circuit design to support manufacture of circuit layers using multiple manufacturing steps; and
a fabric-independent multi-patterning engine configured to perform, independent of the fabric layer, a pattern coloring process according to the set of coloring constraints to determine a color assignment for each geometric element of the geometric elements of the circuit design.

16. The system of claim 15, wherein, for a given coloring constraint in the set of coloring constraints:
the given coloring constraint includes one or more geometric identifiers to apply the given coloring constraint to; and
each geometric identifier of the one or more geometric identifiers corresponds to a respective geometric element in the circuit design.

17. The system of claim 16, wherein the fabric-independent multi-patterning engine is configured to perform the pattern coloring process independent of the fabric layer by constructing a multi-patterning graph from the set of coloring constraints, including by:
representing a given geometric identifier with a given node in the multi-patterning graph;
creating an edge between the given node mapped for the given geometric identifier and a different node mapped to another geometric identifier, the given node and the different node constrained together by a particular coloring constraint in the set of coloring constraints; and
specifying the particular coloring constraint as an edge attribute of the edge.

18. The system of claim 17, wherein the fabric-independent multi-patterning engine is configured to perform the pattern coloring process independent of the fabric layer by determining a respective color assignment for each node in the multi-patterning graph; and wherein the fabric-independent multi-patterning engine is further configured to assign the color assignment to each geometric element of the circuit design mapped to the geometric identifiers represented by the nodes of the multi-patterning graph.

19. The system of claim 16, wherein the fabric-independent multi-patterning engine is further configured to map geometric elements of the circuit design to the one or more geometric identifiers, respectively, such that each geometric identifier of the one or more geometric identifiers comprises one or more values that, each individually or together in combination, uniquely identify a given geometric element in the circuit design.

20. The system of claim 15, wherein a given coloring constraint in the set of coloring constraints violates a geometric limitation of the fabric layer; and wherein the fabric-independent multi-patterning engine is configured to perform the pattern coloring process independent of the fabric layer by determining color assignments for geometric elements of the circuit design based on the given coloring constraint without accounting for the given coloring constraint violating the geometric limitation.

\* \* \* \* \*